United States Patent [19]

Schaffer

[11] Patent Number: 4,546,251
[45] Date of Patent: Oct. 8, 1985

[54] DEVICE FOR MONITORING X-RAY RADIATION AND METHOD OF USING SAME

[76] Inventor: Derace L. Schaffer, 148 Oak La., Rochester, N.Y. 14610

[21] Appl. No.: 588,368

[22] Filed: Mar. 12, 1984

Related U.S. Application Data

[63] Continuation-in-part of Ser. No. 523,095, Aug. 15, 1983.

[51] Int. Cl.⁴ ............................................. G01D 18/00
[52] U.S. Cl. ................................ 250/252.1; 250/337; 250/484.1
[58] Field of Search ................. 250/252.1, 337, 484.1; 378/165, 174, 188, 189; 206/455

[56] References Cited

U.S. PATENT DOCUMENTS

| | | | |
|---|---|---|---|
| 1,632,154 | 6/1927 | Torpin | 378/165 |
| 3,725,703 | 4/1973 | Bucky | 378/174 |
| 3,792,277 | 2/1974 | Yamashita et al. | 250/337 |
| 4,100,414 | 7/1978 | Distenfeld | 250/337 |
| 4,303,857 | 12/1981 | Inoue et al. | 250/337 |

Primary Examiner—Janice A. Howell
Attorney, Agent, or Firm—Shlesinger, Fitzsimmons & Shlesinger

[57] ABSTRACT

Each of a plurality of thermoluminescent detectors (TLD's) is secured to one of a plurality of slides, which are removably mounted in a like plurality of pockets formed in a generally wallet-sized carrier to open on one edge thereof. One additional TLD is secured in a recess in one corner of the carrier to be exposed to all X-ray radiation which falls upon the carrier. Each slide is releasably secured in its associated pocket by means which prevents accidental removal of the slide from the pocket. Whenever the owner of the carrier is subjected to an X-ray examination, he or she removes from the carrier one of the slides having thereon an unused TLD, and by a means of adhesive on the back of the slide adheres the associated TLD directly in the path of the X-ray radiation to which the patient is subjected during the examination. After the examination the slide is returned to its pocket in the carrier. Periodically the used TLD elements, as well as the non-removable TLD element, can be processed in a conventional manner to determine the total amount of radiation recorded by the respective elements. In one embodiment the removable slides are housed in lead-lined pockets and beneath a lead-lined, hinged cover member.

20 Claims, 7 Drawing Figures

DEVICE FOR MONITORING X-RAY RADIATION AND METHOD OF USING SAME

RELATED APPLICATIONS

This application is a continuation-in-part of my co-pending U.S. application Ser. No. 523,095, filed Aug. 15, 1983 for Device For Monitoring X-Ray Radiation And Method Of Using Same.

BACKGROUND OF THE INVENTION

This invention relates to a device for measuring the amount or dosages of X-ray radiation to which a person is exposed during diagnostic X-ray examinations, or the like, as well as the overall X-ray radiation to which a person is exposed over a prolonged period of time. More particularly, this invention relates to a novel dosimeter carrier containing a plurality of removable radiation detectors for use in recording the respective amounts of radiation to which an individual is exposed during several different X-ray examinations, and a non-removable detector for measuring the overall background radiation to which the person is exposed over a prolonged period of time.

With the advent of sophisticated electronic equipment, the average person is exposed each year to more and more X-ray radiation. Also, with more interest in preventative medicine, the average individual is likely to be subjected to more diagnostic X-ray examinations than in earlier years. Even the modern-day home television set is capable of emitting dangerous levels of X-ray radiation. There is, therefore, a need for a relatively simple, compact, reliable means for measuring the quantity or intensity of X-ray radiation to which individuals are exposed during everyday living. Obviously this need is even greater in the case of those who are employed in or near the vicinity of X-ray emitting devices, such as for example medical personnel and supporting staff.

Heretofore efforts have been made to provide radiation detecting devices which can be used for determining the amount of radiation to which an individual has been exposed. U.S. Pat. No. 3,053,983, for example, discloses a film badge designed to be worn by personnel working in atmospheres where they are frequently exposed to hazardous X-ray radiation. The badge contains two strips of X-ray sensitive film, one of which after being used can be removed and developed to measure short term exposure to radiation (e.g. weekly), and the other of which can be removed only by destroying the badge, and is adapted to be used for long term monitoring, for example up to three months.

A major disadvantage of this construction is that it employs special X-ray sensitive film, the accuracy and sensitivity of which have extremely short life spans. The badge also requires careful packaging to avoid latent image fading due to atmospheric moisture. A further disadvantage of such a device is that the badge for housing the film strips is of rather complex construction to allow overlapping of the two film strips, and to provide filtered openings to expose selected portions of the film to background radiation.

U.S. Pat. No. 3,894,238 discloses a laminated dosimetric card (somewhat like an ID card) in which two or more crystal dosimeters or chips, as distinguished from the above-noted X-ray film sensors, are permanently sealed so that the card with all of its chips must be returned to be machine evaluated. Although such crystal dosimeters or chips have superior life spans as compared to film-type sensors, a disadvantage of this construction is that the chips are permanently fixed in the associated carrying card, and therefore cannot monitor individual X-ray exposures. The same is true of the card-type dosimeter taught by U.S. Pat. No. 3,652,854, wherein the chips also are sealed against removal from the card.

U.S. Pat. Nos. 3,612,870 and 3,638,017 disclose, respectively, carriers in which one or more radiation sensing film strips or thermoluminescent detectors (TLD's) are secured beneath removable covers. These constructions also have the disadvantage that their radiation sensing elements (chips or film strips, etc.) are secured in their respective carriers, and are designed to be removed only after they have been used, when it is necessary to measure the accumulated radiation detected by the respective elements.

While these prior art detectors may have certain advantages for special applications, they are nevertheless unsuitable for use in recording X-ray radiation which may be rather intense at selected intervals over a prolonged period of time, such as the typical medical or dental X-ray exposure. Typically such intervals comprise those instances in which a patent or individual is subjected to an X-ray examination for one reason or another. For satisfactory analysis of the radiation to which an individual has been exposed during such an examination, it is desirable to have available a separate, unused TLD which can be used to record in writing not only the date and time of exposure, but also the intensity and amount of X-ray radiation to which the individual is exposed during that particular examination. In addition, of course, it is most important to be able to record the overall or cumulative amount of X-ray radiation to which an individual is exposed over a prolonged period of time.

It is an object of this invention, therefore, to provide an improved wallet or compact-sized dosimeter device, which is particularly suitable for use in monitoring the amount of radiation an individual receives during one or more X-ray examinations conducted over a period of time, as well as for monitoring the overall amount of radiation to which the individual is exposed during the last-named period and for recording in writing pertinent information regarding the X-ray exposure.

A further object of this invention is to provide a novel dosimeter carrier, which contains a plurality of removable radiation sensing elements for use during X-ray examinations and the like and one additional sensing element which is not removable from the carrier, and which is designed to record the background X-ray radiation over a prolonged period of time.

Still another object of this invention is to provide a novel carrier of the type described which includes means for preventing accidental removal and reuse of the removable sensors once they have been used to measure radiation.

A more specific object of this invention is to provide a novel dosimeter carrier of the type described which includes means for shielding at least certain radiation sensors therein from background radiation.

It is an object also of this invention to provide a novel method of recording the amount of radiation to which an individual is exposed during X-ray examinations, as well as the cumulative background radiation to which the individual is exposed over a prolonged period of time.

SUMMARY OF THE INVENTION

In one embodiment two flexible, rectangularly shaped pieces of plastic have confronting, lead-coated surfaces, which are secured together to form a generally card-shaped carrier having formed between the lead surfaces a plurality of spaced, parallel pockets, which are closed at their inner ends and open at their outer ends along one edge of the carrier. Removably mounted in each pocket is an elongate slide, which has secured to one side thereof an X-ray sensitive detector and to its opposite side a layer of pressure sensitive adhesive, which has a protective layer of plastic removably secured thereover. A cover, which is made of the same materials as the carrier, and which may or may not also have a lead coating on one surface thereof, is pivotally connected to said one edge of the carrier to be foldable over against the carrier, and thereby to prevent accidental removal of the slides from the pockets.

In use, each slide can be removed from the carrier and adhered to a surface which is positioned in the path of radiation emitted by an X-ray machine during examination of the patient to whom the carrier belongs. After the examination the card can be reinserted in the carrier where it is protected from further exposure to any radiation. A further sensing element which is secured in a recess in the outer surface of the carrier is constantly exposed to background radiation, thereby to provide means for recording the cumulative X-ray radiation to which a patient or person is exposed over a prolonged period of time. When all the slides have been exposed to radiation, their sensors, plus the cumulative sensor, can be subjected to a conventional measuring process to detect the respective amounts of radiation recorded by the sensors.

In a second embodiment the lead shields and hinged cover are eliminated, and the slides have openings in their inner ends which register with dimples formed on the carrier to project releasably into the openings in the slides.

THE DRAWINGS

DETAILED DESCRIPTION OF THE PREFERRED EMBODIMENTS

Figure 1:
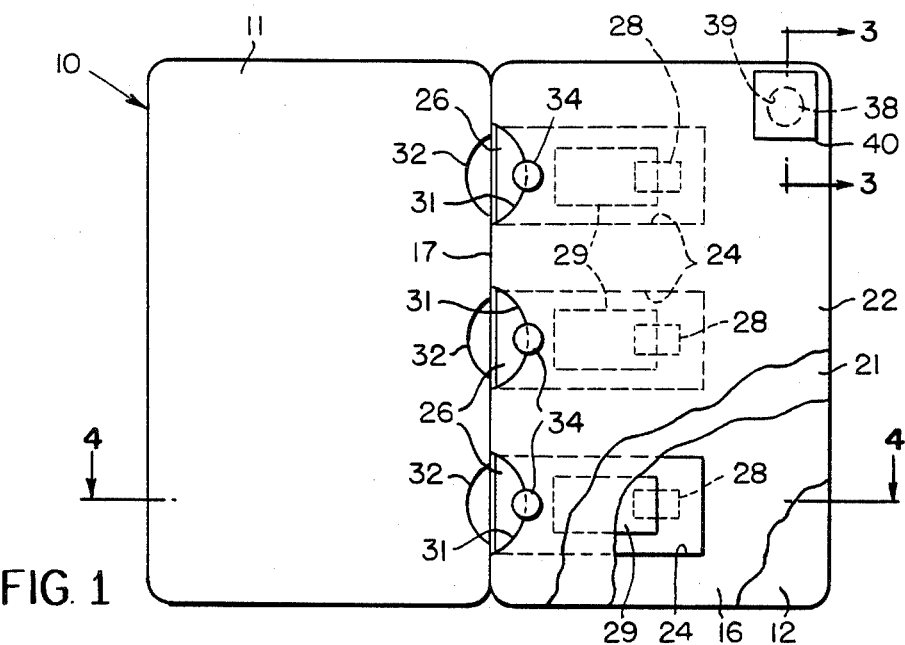
FIG. 1 is a plan view of a dosimeter carrier made according to one embodiment of this invention, the carrier cover being shown in its open position and portions of the carrier being cut away for purposes of illustration.

Referring now to the drawings by numerals of reference, and first to the embodiment shown in FIGS. 1–4, 10 denotes generally a flexible, plastic substrate comprising two, similarly shaped, rectangular, generally wallet-size sections 11 and 12, which are pivotal relative to each other about a seam 13 that extends transversely of the substrate 10 medially of its ends. Secured to and completely covering one surface of the substrate section 12 is a thin layer 16 of lead foil. This layer 16 of lead foil is covered by a similarly shaped layer 21 of lead foil, which in turn is covered by a similarly shaped layer 22 of flexible, plastic material which may be similar to the material which forms the substrate 10.

Although the foil layer 21 is secured in coplanar engagement with the covering layer 22 of plastic, it is secured to the other, confronting foil layer 16 only in those areas which lie outwardly from three, spaced, parallel, rectangularly shaped pockets 24, which are formed between the two foil layers 16 and 21. The pockets 24 are closed at their inner or right ends, as shown in FIG. 1, and open at their outer ends or left ends adjacent the carrier seam 13.

Removably and slidably mounted in each of the pockets 24 is a generally rigid, rectangularly shaped card or slide 26, which has secured in a recess in one side thereof a radiation detecting element 28. In the embodiment illustrated this element is shown to be in the form of a rectangular chip, which can be made from any conventional thermoluminescent detector (TLD) material, such as for example lithium fluoride. The exact detector material used, and/or its configuration, may of course be changed as desired without departing from this invention. Each slide 26 has secured on the reverse side thereof (the side opposite to that containing the chip 28) a layer of pressure sensitive adhesive, which is covered by a removable plastic strip 29 that functions in a conventional manner to prevent undesirable exposure of the adhesive until it is desired to place the respective slide 26 in use.

Figures 2, 3:
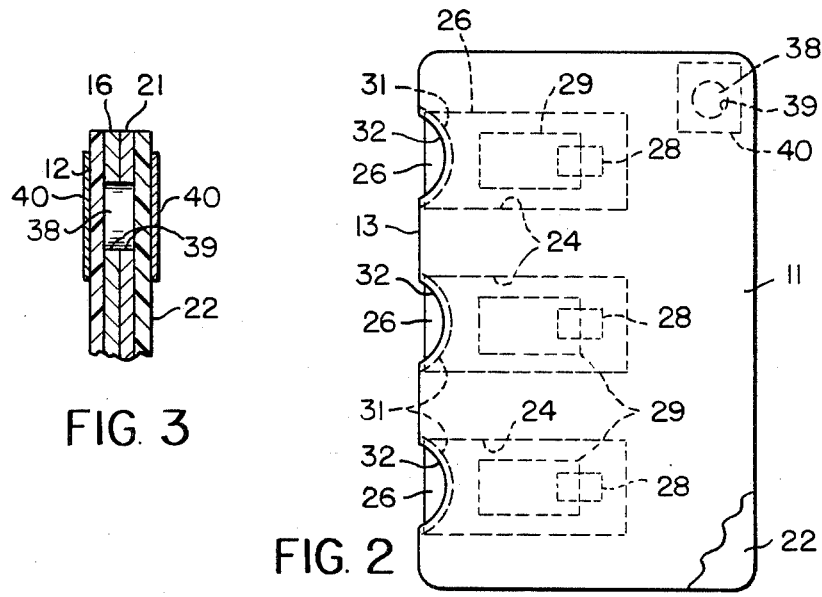
FIG. 2 is a view similar to FIG. 1 but showing the carrier cover in its closed position.
FIG. 3 is an enlarged, fragmentary sectional view taken along the line 3—3 in FIG. 1 looking in the direction of the arrows.
Figure 4:
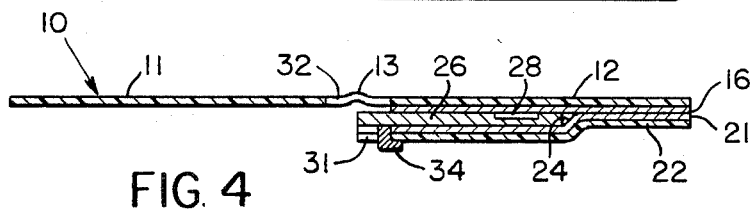
FIG. 4 is a sectional view taken along the line 4—4 in FIG. 1 looking in the direction of the arrows.

To ease the removal of a slide 26 from the carrier, when the cover section 11 of the substrate is in its open position as shown in FIG. 1, registering portions of the layers 12, 16, 21 and 22 are cut away adjacent the open ends of the pockets 24 (the left ends in FIG. 1), thereby to form in opposite sides of each pocket arcuate notches or recesses 31, which register with the outer end of the associated slide 26. Similar but smaller arcuate notches 32 are formed in the confronting edges of the substrate sections 11 and 12 centrally of the seam 13 so as to register with the pocket notches 31. However, as noted in FIG. 2, because the notches 32 are slightly smaller in diameter than the notches 31, when the cover section 11 is folded over into a closed position against the layer 22, as shown in FIG. 2, the slides 26 are too wide to be withdrawn through the openings defined by the registering notches 32, whereby accidental removal of the slides is prevented when the cover section 11 is closed.

Also to prevent accidental removal of slides 26 when the cover section 11 is open, and to provide means for indicating when a particular slide detector has been used, the slides 26, when initially inserted or assembled into the pockets 24, are removably secured therein by frangible or rupturable seals 34 of wax or plastic, (FIGS. 1 and 2) which are positioned at the junctures of the pocket recess 31 and at least one side of the associated slide 26.

In addition to the removable elements 28, one non-removable TLD element 38 is secured in registering openings 39 formed in the foil layers 16 and 21 between registering corners of the plastic layers 12 and 22. As shown more clearly in FIG. 3, although the peripheral edge of element 38 is surrounded by the protective lead layers 16, 21, opposite sides thereof confront upon the transparent section 12 and 22. Two, opposed rectangularly shaped pieces 40 of the lead foil, or the like are releasably secured to layers 12 and 22 normally to shield opposite sides of element 38 from exposure to X-ray radiation. However, when these shields are removed, as noted hereinafter, the element 38 operates to record any ambient or background X-ray radiation to which the carrier is exposed. And this is true even when the cover section 11 is in its closed position against the plastic layer 22.

When a carrier of the type described is to be placed in use by an individual, the first step is to remove the shields 40 so that element 38 can commence to measure, twenty-four hours a day, the ambient or background X-ray radiation to which that person is exposed. However, one of the principal purposes of this invention is to provide an individual with means for determining the quantative radiation dosage from medical diagnostic sources, for example on a per examination or per visit basis. Therefore, when the owner of the carrier is to be subjected to an X-ray examination, he or she may open the cover 11 and remove one of the slides 26. This ruptures the associated seal 34, thereafter indicating that the associated element 28 has been used for recording radiation. The plastic cover 29 on the back of the slide 26 is removed to expose the pressure sensitive adhesive, which is then used for releasably securing that particular slide on the patient or on the supporting structure of the associates X-ray equipment, and in such manner that the associated TLD element 28 will be directly exposed to the same X-rays to which the patient is being exposed. During such examination the carrier itself is kept away from the X-ray equipment so that the non-removable element 38 will not be exposed to any X-ray radiation that is being used for examination purposes.

At the end of the examination the slide card 26 is removed from the supporting structure and returned to the proper pocket 26 in the carrier. Pressure can then be applied to opposite sides of the pocket to cause the pressure sensitive adhesive on the slide to engage the confronting pocket wall, thereby to secure the used slide and associated element 28 against accidental removal from the pocket. The result is that this particular element or chip 28 has recorded the amount of X-ray radiation to which the patient was exposed during that particular examination.

During subsequent X-ray examinations, for example during the next two successive examinations, the other two slides 26 can be removed and employed one at a time in a manner as noted above to record the amount of radiation to which the patient was exposed during each of the next successive examinations. Information regarding the respective examination, such as the date, the M.D. present, etc. can be entered on the back of the slide 26, or can be recorded at any convenient location on the carrier substrate 10.

After the three TLD elements 28 have been exposed, or at any other time if preferred, the respective elements 28, as well as the cumulative recording TLD element 38 can be subjected to conventional processing to determine the respective amounts of radiation recorded by each of the elements 28 and 38.

Figures 5, 6:
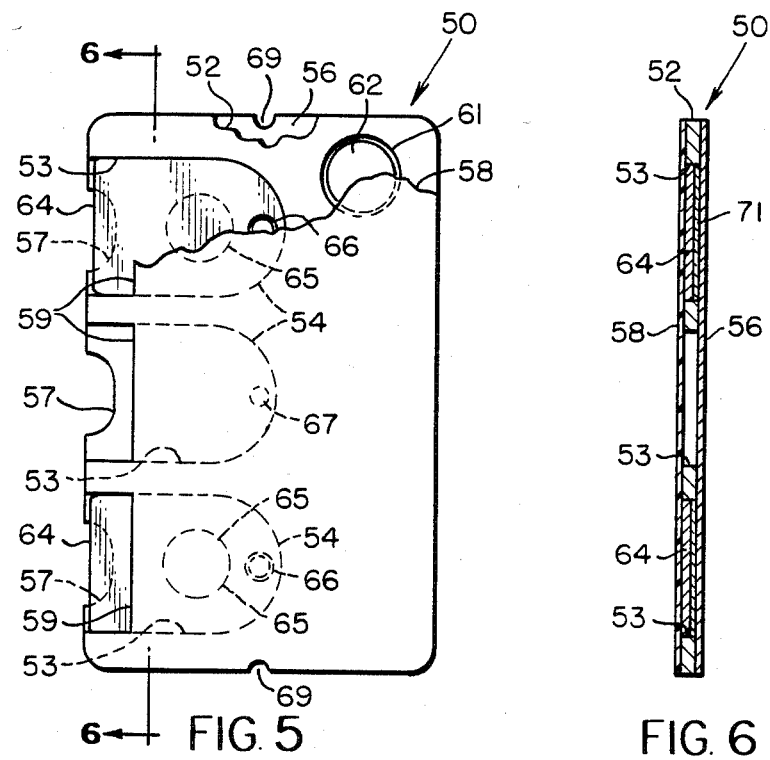
FIG. 5 is a front plan view of a dosimeter carrier made according to a second embodiment of this invention, portions of the carrier being cut away, and only two of the three slides being shown in the carrier.
FIG. 6 is a sectional view taken along the line 6—6 in FIG. 5 looking in the direction of the arrows.
Figure 7:
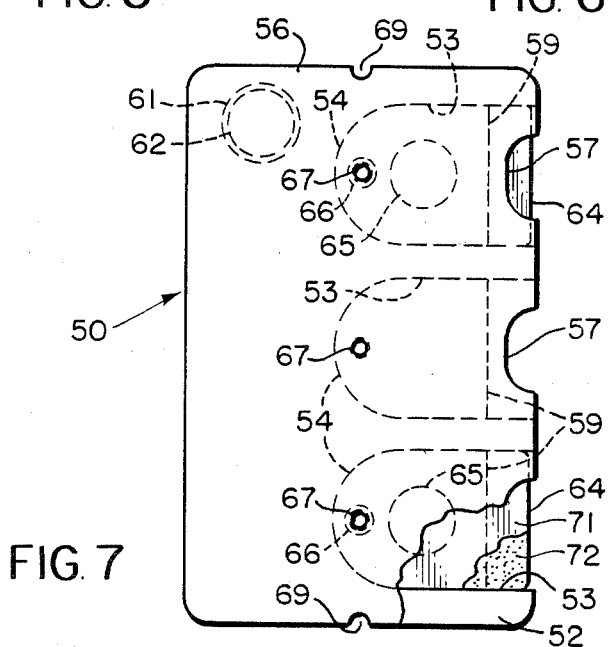
FIG. 7 is a rear plan view of the carrier shown in FIG. 5 but with portions thereof cut away.

In the embodiment shown in FIGS. 5 to 7, numeral 50 denotes generally a modified carrier comprising a relatively stiff, plastic, vinyl core 52, which has been coated with a pressure sensitive adhesive, and which is die cut into generally rectangular configuration, and in such manner that it has formed in one edge thereof (the left edge in FIG. 5) three, spaced, parallel pockets or slots 53 the inner ends of which are rounded as at 54. Laminated to the back of core 52 is a backing sheet or die cut layer 56 of opaque vinyl or other vinyl-like plastic material. Layer 56 is cut into the same rectangular configuration as layer 52, and so as to have in one edge thereof (the left edge in FIG. 5) three, shallow, arcuate notches 57 which register centrally with the outer ends of the slots 53 in the core 52.

Laminated also with pressure sensitive adhesive to the face of core 52 is a transparent layer or film 58 of plastic material such as "Mylar". Film 58 also may be die cut to have essentially the same rectangular configuration as core 52 and the backing layer 56. The cover layer 58 also has formed in one edge thereof three, spaced, generally rectangularly shaped notches 59 which are in registry with, and approximately as wide as, the slots 53 in core 52. Although not shown in FIG. 5, the cover sheet 58 is designed to have information printed on the inside surface thereof before its lamination to core 52, and so as to be visible against the background of core 52 after being secured thereover.

Secured between layers 56 and 58 in an opening 61 formed in the core 52 adjacent one corner thereof is a first thermoluminescent detector (TLD) or chip 62, which may be made of lithium fluoride, calcium sulfate, or other suitable material. Removably mounted in each of the pockets 53 between layers 56 and 58 is a slide 64, which has secured thereon intermediate its ends another radiation detector (TLD) 65. Each slide 64 is generally similar in configuration to a pocket 53 in core 52, and has, therefore, a rounded end disposed to seat against the rounded inner end 54 of a pocket when properly mounted therein. Adjacent its rounded end each slide 64 has therein an opening 66 disposed to register with a small dimple or detent 67 formed in the backing layer 56 to snap frictionally into an opening 66 in one of the slides 64 when the latter is properly seated in respective pocket 53, thus releasably to retain or hold the slide in the pocket.

Registering notches 69 are formed in the opposed side edges of each of layers 58 and 56 and the core 52 to enable automatic manipulation or machine handling of a carrier 50 when it is being processed.

In use, each of the removable slides 64 is adapted to be employed in a manner similar to slides 26 of the first embodiment. For this reason, each slide has on the back side thereof a removable, plastic cover section 71, which normally covers a layer of pressure sensitive adhesive 72 that is formed on the back of each slide 64 for use in mounting the slide on the supporting structure of X-ray equipment, or preferably on the patient as described in connection with the first embodiment. The detector 62, on the other hand, remains at all times in carrier 50 to record only background radiation, and not the unusual amounts of radiation for which the detectors 65 are employed.

From the foregoing it will be apparent that the present invention provides a relatively simple and inexpensive means for monitoring radiation in X-ray examinations. This invention better enables individuals to keep track of the overall amount of X-ray radiation to which they have been exposed over the years. Whenever the element 28 or 65 of a particular slide 26 or 64 has been subjected to radiation, it can, of course, be immediately replaced by a new slide and new element. Used TLD elements 28 or 65 can thus be processed without interferring with the normal usage of the associated carrier. Since the TLD element 38 or 62 is not, at least in practice, exposed to the X-ray radiation which occurs during a given X-ray treatment or examination, it will provide a record of the amount of radiation to which an individual has been exposed over a prolonged period of time, exclusive of that radiation recorded by the elements 28 or 65. It is thus possible for an individual to determine both the cumulative and the selective X-ray radiation dosages to which he or she has been exposed over long periods of time.

Although it has been suggested that the TLD's be employed for measuring X-ray radiation, it will be readily apparent that the type of radiation measured need not be limited to X-ray radiation, but may be any type of ionizing radiation. The TLD's are particularly suitable because of their stability over prolonged periods and despite changes in ambient pressure, temperature and moisture levels.

Also, although in the first embodiment the foil layers 16 and 21 and the plastic layers 22 and 12 have been described as being separate from each other, it will be readily apparent to one skilled in the art that the foil layer 21 could be a folded extension of the layer 16, while the plastic layer 22 likewise could be a folded extension of the substrate section 12. In the case of the second embodiment, information could be printed on the outer surface of layer 56, in which case the printed surface would then be sealed with a transparent plastic film to prevent scuffing. And in either case, of course, the exact configuration of the carrier could be altered (e.g. made to be round rather than rectangular) without departing from this invention.

Moreover, while this invention has been illustrated and described in detail in connection with only certain embodiments thereof, it will be readily apparent that it is still capable of still further modification, and that this application is intended to cover any such modifications as may fall within the scope of one skilled in the art or the appended claims.

I claim:

1. A device for measuring cumulative and selective ionizing radiation dosages, such as X-ray radiation dosages, comprising
   a portable, generally wallet-sized carrier having therein a plurality of spaced, similarly-shaped pockets,
   a support member removably mounted in each of said pockets,
   a first plurality of radiation sensitive elements secured to said support members for movement therewith into and out of said pockets,
   a further radiation sensitive element mounted in said carrier adjacent said pockets,
   cooperating retaining means on said carrier and on said support members, respectively, and operative releasably to secure said members from accidental movement from said pockets, and
   means fixing said further radiation sensitive element in said carrier to prevent removal of said further element except by destroying said carrier in the vicinity of said further element.

2. A device as defined in claim 1, wherein
   said pockets are lined with lead substantially to shield said first plurality of elements from ambient X-ray radiation, when said first plurality of elements are positioned in said pockets, and
   said further element is fixed in said recess beneath removable X-ray shields, whereby when said shields are removed said further element is exposed to all ambient X-ray radiation.

3. A device as defined in claim 2, wherein said carrier comprises
   a first, generally wallet-sized section containing said pockets, and
   a second, generally wallet-sized cover section pivotally connected along one edge thereof to one edge of said first section to be folded between a closed position in which it overlies and covers one surface of said first section to prevent removal of said members from said pockets, and an open position in which it exposes said pockets to permit removal of said members from said pockets.

4. A device as defined in claim 3, wherein said further element is secured in a recess formed in said first carrier section adjacent one corner thereof.

5. A device as defined in claim 2, wherein said retaining means comprises a rupturable seal releasably holding said members against initial movement out of said pockets when said cover section is open.

6. A device as defined in claim 1, wherein
   each of said support members has thereon a plane surface disposed in confronting relation to a plane surface on said carrier, when said member is fully seated in one of said pockets, and
   said retaining means comprises a projection formed on one of said confronting surfaces and releasably and frictionally engaging in a recess in the other of said surfaces, when the associated support member is fully seated in a pocket.

7. A device as defined in claim 6, wherein said recess in the other of said surfaces comprises an opening formed in each of said members, and said projection comprises a detent formed on and projecting from the inside of each of said pockets to engage in said opening in one of said members, when the latter is fully seated in the pocket.

8. A device as defined in claim 1, including means on each of said members for removably supporting the member in the path of X-ray radiation, when the member is removed from the carrier.

9. A device as defined in claim 8, wherein said supporting means comprises a layer of pressure sensitive adhesive on one side of each of said members.

10. A device as defined in claim 1, wherein said carrier is generally rectangular in configuration, and said pockets open on the outer, peripheral edge of said carrier.

11. A device as defined in claim 1, wherein said carrier comprises
    a substantially rigid, generally rectangularly shaped, planar core having a plurality of spaced, pocket-forming slots extending inwardly from the outer, peripheral edge thereof and
    a pair of flexible, planar laminates secured to opposite sides, respectively, of said core substantially to cover and form said slots into said pockets in the carrier, each of said laminates having in the peripheral edge thereof spaced notches which register with the outer ends of the slots in said core, and with the outer ends of said members when the latter are seated in said pockets, thereby to expose a portion of the outer end of each of the last-named members.

12. A device as defined in claim 11, wherein said further element is secured in an opening formed in said core adjacent one corner thereof, and said means fixing said further element in said carrier comprises said laminations, which extend over and seal opposite sides of said opening.

13. A device as defined in claim 2, wherein said carrier comprises
   a pair of rectangularly shaped, generally wallet-sized plastic laminates secured in registration with each other, and
   two layers of lead foil secured in confronting relation to each other between said laminates and having registering portions thereof separable from each other to define said pockets,
   said further element being secured in registering openings in said layers of foil between said laminates in a location spaced from said pockets, and with opposed surfaces thereof confronting on said laminates.

14. A device as defined in claim 13, wherein said shields comprise pieces of lead foil releasably secured to said laminates to overlie said opposed surfaces of said further element.

15. A dosimeter carrier, comprising
   a rectangularly shaped, generally wallet-sized housing having therein a plurality of pockets which open along one edge of said housing.
   a plurality of radiation sensors removably mounted in said pockets,
   a radiation sensitive element secured to each of said sensors for movement therewith into and out of said pockets,
   means for releasably holding said sensors in said pockets, and
   a further radiation sensitive element secured in said housing to be exposed at all times to any ambient X-ray radiation to which said housing is exposed.

16. A dosimeter carrier as defined in claim 15, including means in said pockets for preventing ambient X-ray radiation from falling on said elements when positioned in said pockets.

17. A dosimeter carrier as defined in claim 13, wherein said holding means includes a cover pivotally connected to said one edge of said housing and foldable over one side thereof to prevent removal of said sensors from said housing.

18. A dosimeter carrier as defined in claim 17, wherein said holding means further includes rupturable means releasably sealing said sensors against movement relative to said housing.

19. A dosimeter carrier as defined in claim 15, wherein
   the outer surfaces of said sensors are disposed in confronting, sliding relation to the inside surfaces of said pockets, and
   said holding means comprises detents formed on one of the last-named confronting surfaces and projecting into resilient, releasable engagement with cooperating, registering recesses formed in the other of said confronting surfaces.

20. A method of monitoring a person's exposure to medical and dental X-ray radiation, comprising
   providing a person with a small, generally wallet-sized dosimeter carrier containing a plurality of removable radiation sensitive elements, and at least one non-removable radiation sensitive element,
   temporarily removing a previously unused, removable element from said carrier and placing it in the path of the X-ray radiation to which said person is exposed during an X-ray examination,
   replacing the used element in the carrier after said examination to protect it from exposure to any further medical or dental X-rays,
   continuously exposing said non-removable element to all background or ambient X-ray radiation, except to said medical and dental X-rays, and
   periodically determining the amount of X-ray radiation recorded by the used elements in said carrier, and by the non-removable element.

* * * * *